United States Patent Office 3,240,793
Patented Mar. 15, 1966

3,240,793
PROCESS FOR THE PRODUCTION OF ALKALOIDS FROM PLANTS OF THE GENUS HOLARRHENA
Jean Louis Paul Mainil, Watermael-Boitsfort, Belgium, assignor to Société Anonyme Oletta, Luxembourg, Luxembourg
No Drawing. Filed June 1, 1962, Ser. No. 199,266
Claims priority, application Belgium, June 2, 1961, 604,547; Aug. 23, 1961, 607,428; Mar. 23, 1962, 615,483
14 Claims. (Cl. 260—397.3)

Prior patents have described methods for producing alkaloids adapted to serve as intermediates for the synthesis of steronic, corticosteronic and like chemical compounds originating from the plants of the genus Holarrhena (Apocynaceae) and, more particularly, of the species *africana* and *floribunda*.

Prior patents have also described

An alkaloid showing an antirheumatism and an antiasthma action (holamine)

A medicine having an antirheumatism action (holaphylline)

A medicine for the treatment of hormonal deficiency (holaphyllamine)

An object of this invention is to provide for the synthesis of such compounds and also of additional compounds.

Various aspects of the invention will now be described hereunder.

I. SYNTHESIS OF HOLAPHYLLAMINE

Holaphyllamine or 3β-amino-20-oxo-pregna-5-one is obtained from the starting material pregnenolone. Paratoluene-sulphonate of pregnenolone (prepared in conventional manner) has a melting point of 140–141° C.

10 gr. of tosylate of pregnenolone, together with 200 c. cm. of toluene and 70 c. cm. of liquid ammonia $NH_3$ are furthermore heated in an autoclave for 24 hours at 100° C. at a pressure of about 20 kg.

After cooling, the autoclaved liquid is evaporated to dryness, then dissolved in ether and treated with 100 c. cm. of a soda lye. The solution obtained is stirred and allowed to settle, after which the ether solution is washed with water. By the addition of concentrated hydrochloric acid into the ethereal solution the amines are precipitated. The hydrochloric acid is added until no further precipitation is produced.

The ether solution washed with water is treated with an alkaline product and evaporated. The residuum of the aforesaid evaporation is subjected to a chromatographic procedure on alumina and standardized according to Brockman's method. Said residuum is eluted in succession in the conventional manner with hexane, benzene, ether, and methanol.

The presence of the following products has been proved:

$\Delta^{3,5}$-pregnadiene-20-one eluted by a mixture of benzene and petroleum ether, 17-iso-$\Delta^5$-pregnen-3β-ol - 20 - one eluted by ether and formed probably through a partial and temporary enolization in an alkaline medium, Pregnenolone, eluted by methanol.

The precipitated amine hydrochloride is diluted in alcohol and is alkalinized by 100 c. cm. of soda lye, after which an extraction with ether is performed. The ether solution is washed with water and the washed ether solution is dried free of water by the addition of sodium sulphate and then evaporated.

The product is then subjected to chromatographic analysis on alumina and it is eluted with solvents of different polarities.

Out of the fraction eluted with methanol, a product is separated, of which the hydrochloride has an infra-red spectrum which is identical with that absorved for natural hydrochloride of holaphyllamine separated out of the leaves of *Holarrhena floribunda*.

It has also been found that said compound is actually a 3β-derivative, as shown by its transformation into an insoluble digitonide.

II. SYNTHESIS OF HOLAMINE

In a further test, the amination of tosylate of pregnenolone is effected with a large amount of liquid ammonia and a very small amount of toluene. The product is then heated for 27 hours at 80 to 85° C. in an autoclave at a pressure of 120 kg. and the autoclaved liquid is treated in the same manner as hereinabove.

Through elution with methanol, it is possible to separate a further compound identical with the natural compound as prepared out of Holarrhena leaves. This compound is holamine, characterized by the infra-red spectrum of its hydrochlorate.

Physiological activity

Investigations show the therapeutic value of holaphyllamine.

Holaphyllamine

This product exerts a powerful hypertrophic action on seric gonadotrophine and, therefore, constitutes a contraceptive, intended for the purposes of birth control. Said product may be administered orally in the form of lozenges or as a beverage or instead it may be administered as an injectable solution, or as a suppository and the like. The operative doses range between 2 and 100 mg. per day.

III. SYNTHESIS OF HOLAPHYLLINE

Preparation of tosylate of pregnenolone 20 gr. of pregnenolone are dissolved in 70 ml. of slightly warm anhydrous pyridine. Into the tepid solution are incorporated 20 gr. of sulphochloride of paratoluene which have been previously recrystallized in chloroform.

The products are left in contact with each other for one night.

They are then introduced into 1,200 ml. of ether inside a settling tank and 1 l. of water is added. The ether is then washed three times with 300 ml. of distilled water, dried free of water by the addition of sodium sulphate and distilled.

During distillation, the tosylate crystallizes forming a product which when fully dried has a weight of 15.2 gr.

Recrystallized in ether, the final product melts at 143–144° C.

Action of methylamine on tosylate

In an autoclave, 10 gr. of tosylate of pregnenolone are heated with 200 ml. of 10% benzene of methylamine solution, at 100° C. for 22 hours. The solution is then evaporated until dry and the dried product dissolved in ether and 100 ml. of 10% soda.

The ether solution is finally washed twice with 100 ml. of water. The hydrochlorides are precipitated in the ether by the addition of hydrochloric acid and are thereafter dried.

When placed in an acid medium, the fraction which is soluble in ether forms a fraction termed A.

The fraction which is insoluble in ether forms a fraction B.

*Treatment of the fraction A*

The ether solution is first washed with water; said water is incorporated with the fraction B, after which it is washed with alkaline water until neutrality is obtained. The ether is again washed with water, and the product is dried and distilled. The residuum weighing 5.1 gr. is dissolved in benzene and caused to pass on 35 gr. of alumina.

The product obtained through elution with benzene has a melting point of 128° C., $\alpha_D = -21°$ and its formula is $C_{21}H_{30}O$. Chromophotographic methods on said product will restore the prengenolone which forms the starting product.

*Treatment of the fraction B*

The fraction mentioned above as being insoluble in ether which was combined with the washings of ether fraction A is extracted with ether after alkalinization with soda lye. The alkaline ether extraction is washed with water, dried free of water by the addition of soduim sulphate and distilled.

The residuum weighing 5.1 gr. is caused to pass on 12.0 gr. of alumina.

|  | Gr. |
|---|---|
| Elution with benzene | 2.7 |
| Elution with ether | 1.3 |
| Elution with methanol | 1.1 |

The eluted product obtained through elution with methanol is identical with natural holaphylline (melting point=128° C.) with the same infra-red spectrum and $[\alpha]_D = +23°$.

*Analysis.*—Calculated for $C_{22}H_{35}ON$: C, 80.19%; H, 10.70%; N, 4.23%. Found C, 80.33%; H, 10.76%; N, 4.30%.

*Examination of one of the other fractions obtained through chromatography*

*Fraction eluted with benzene.*—The hydrochloride of the fraction eluted with benzene is methylated through Eschweiler's method. 760 mgr. of the base are treated in a boiling water bath for five hours with 2.5 ml. of formic acid and an equal amount of formaldehyde. The solution when cooled is alkalinized with ammonia and extracted with ether.

The solution is previously washed with ether before the alkaline treatment. The washing ether is washed with water, dried free of water by the addition of sodium sulphate and distilled. There is obtained a product weighing 580 mgr. which is not of an alkaloidic nature. Said product is subjected to a chromatographic treatment on 15 gr. of alumina so as to produce, through elution with ether, pregnenolone.

The identity of the product with pregnenolone is checked by its melting point when mixed with pregnenolone obtained by a conventional method and by its infra-red spectrum.

The steroids such as holaphylline have an anti-inflammatory activity which is beneficial and of an intensity which is higher than that of hydrocortisone, while being less toxic.

IV. METHYLHOLAPHYLLINE OR 3β-DIMETHYL-AMINO-OXO-20-PREGN-5-ENE STARTING FROM HOLAPHYLLINE

A mixture of 250 mgr. of holaphylline with 3.5 ml. of formic acid and 3.5 ml. of a 33% solution of formic aldehyde is treated in a boiling water bath provided with air-cooling means for 4 hours. The mixture is allowed to cool, diluted with water and extracted with methylene chloride after alkalinization with ammonia. The methylene chloride is washed with water, then made free of water by the addition of sodium sulphate and distilled.

The residuum, 27.0 mgr., is subjected to a chromatographic treatment on 8 gr. of alumina.

A first fraction eluted with benzene, and weighing 100 mgr., crystallizes in acetone and produces through further crystallization a product having a melting point at 121° C., $[\alpha]_D = 30.4°$ C. ($CHCl_3$, c.=0.86).

*Analysis.*—Calculated for $C_{23}H_{37}ON$ (343.53): C, 80.41%; H, 10.86%; N, 4.08%. Found: C, 80.53%; H, 10.79%; N, 3.89%.

V. SYNTHESIS OF 3β-DIMETHYLAMINO-OXO-20-PREGN-5-ENE OR METHYLHOLAPHYLLINE

*Preparation of tosylate of pregnenolone.*—20 gr. of pregnenolone are dissolved by slight heating of 70 ml. of anhydrous pyridine kept over potash. To the tepid solution obtained, there is added 20 gr. of sulphochloride of paratoluene which has been purified through a second crystallization in chloroform.

The products are allowed to remain in contact with each other for one night.

They are then introduced into 1200 ml. of ether inside a settling phial, after which 1 l. of water is added. The solution is extracted twice with 500 ml. of ether. The ether is washed with water, dried free of water by the addition of sodium sulphate and distilled. The residuum is recrystallized in ether and is drained; the product weighing 15.5 gr. has a melting point at 144° C.

*Action of dimethylamine on tosylate*

10 gr. of tosylate are heated in an autoclave with 150 ml. of 33% benzenic solution in benzene of dimethylamine for 24 hours at 100° C.

The solution is then evaporated to dryness and the dried material dissolved in 500 ml. of ether and 100 ml. of 10% soda lye. The ether is washed twice with water and made free of water by the addition of sodium sulphate. The hydrochlorides are precipitated by addition of hydrochloric acid and drained.

The fraction which is soluble in ether forms the fraction A. The ether insoluble fraction forms the fraction B.

*Treatment of the fraction B*

The hydrochloride precipitate is dissolved in ethanol and the solution obtained is diluted in water and extracted with ether after alkalinization with soda. The ether is washed with water, dried of water removed by the addition of sodium sulphate and distilled.

The residuum, 4.5 gr., is caused to pass on 90 gr. of alumina. Elution with hexane produces 1.6 gr. of a product crystallizing in methanol, having a melting point at 109° C.

Elution with 10% ether produces 0.930 gr. of a product which crystallizes in methanol.

The product, melting at 109° C., appears to be 3,5-cyclo-6-dimethylaminopregn-20-one.

Melting point: 109–110° C., $[\alpha]_D = +128°$.

*Analysis.*—Calculated for $C_{23}H_{37}ON$: C, 80.41%; H, 10.86%; N, 4.08%. Found: C, 80.34%; H, 10.84%; N, 4.28%.

Upon stirring for 24 hours in the presence of platinum and in an atmosphere of hydrogen, no absorption is found and the initial product is recovered.

Elution of the recovered initial product with ether produces 1.8 gr. of a substance crystallizing in methanol, and having a melting point at 121° C.

VI

Holaphyllamine and holamine can also be synthesized as follows: The nucleophilic substitution of the 3β-tosyloxy derivatives in the Δ⁵-steroid series by the N⁻³ anion is produced, when the reaction is performed in methanol, to a mixture of the 3β-azido and 3,5-cyclo-6β-azido derivatives. Retention of the pattern of the 3β-derivative is attributed to isosteroid phenomenon. When the reaction is performed in dimethylsulphoxide, only the 3-azido derivative is yielded, with pattern reversal. Reduction of the azido derivatives by AlLiH₄ produces the primary amines. These reductions make it possible to prepare holaphyllamine, 3β-amino 5-pregnene-20-one and holamine, 3α-amino 5-pregnene-20-one.

Reaction in methanol

*Pregnenolone tosylate.*—20 g. of pregnenolone are dissolved with slight heating in 70 cc. of pyridine. 20 g. of sulphonic paratoluene acid chloride are added and the mixture is left in contact for one night in darkness. After dilution with 1 litre of water, the mixture is extracted three times with ether and the ether is washed, dried and distilled. During distillation the tosylate crystallizes and is centrifuged; 25.9 g., melting point 143° C.

*3β-tosyloxy-20-oximo-pregn-5-ene.*—To 150 cc. of anhydrous benzene are added 2.8 g. of hydroxylamine hydrochloride, 3.3 g. of anhydrous sodium acetate and 9.2 g. of pregnenolone tosylate. The mixture is reflux heated with agitation for 3 hours. The reaction mixture is washed in water and then dried free of water by the addition of sodium sulphate. After concentration 6.7 g. of crystallised oxime are yielded with a melting point of 168–169° C.; a second stream, with a melting point of 160° C., is isolated from the mother liquors by an addition of petroleum ether. For analysis the product is recrystallized in benzene; melting point 169° C.; $[\alpha]_D = -39°$ (CHCl₃, c. −1.13).

*Reaction of lithium azide in methanol solution on tosyloxy-oximo-pregnene.*—A solution of sodium azide in methanol is prepared as described by R. Huisgen (Ber. 1957, 90, 2914), 4.25 g. of lithium chloride and 6.85 g. of sodium azide being added to 100 c. of methanol. The mixture is boiled with reflux for 4 hours. After hot filtration a lithium azide solution is yielded with about 0.9 mol azide contents. 2 g. of the above oxime are added to the solution and the mixture is reflux heated in a nitrogen atmosphere for 7 hours. After concentration the mixture is diluted with water and extracted with a 1:2 benzene-ether mixture. The organic phase is washed in water, dried free of water and evaporated to dryness. An uncrystallized residue weighing 1.500 g. is yielded.

*Reduction of the azido derivative by AlLiH₄.*—To this uncrystallized residue are added 100 cc. of anhydrous ether and 1 g. of aluminium-lithium hydride, and the mixture is agitated at laboratory temperature for 1 night. Excess hydride is destroyed by the addition first of ordinary ether, then water. The alumina precipitate formed is redissolved by an addition of hydrochloric acid and water, and then 20 g. of potassium sodium tartrate are added to the solution. The same is made alkaline by ammonia, then extracted with ether. After evaporation a residue of uncrystallized bases weighing 1.30 g. is yielded.

*Hydrolysis of the oxime function.*—The previous residue of uncrystallized bases is treated by reflux boiling in a mixture of 20 cc. of 25% HCl and 150 cc. of methanol for 2½ hours, then concentrated to 100 cc. This solution is diluted with water and treated with ether which removes 375 mg. of unaminated products. The aqueous phase is then made alkaline with ammonia, and extracted with methylene chloride. After conventional treatment the methylene chloride when evaporated to dryness leaves a residue weighing 815 mg. This residue is dissolved in 50 cc. of benzene and chromatographed on 25 g. of alumina. It is washed out in 150 cc. fractions.

| Fractions | Eluent | Weight, mg. |
|---|---|---|
| 1–3 | Benzene | 20 |
| 4–7 | 1:1 benzene-ether | 320 |
| 8–10 | Ether | 82 |
| 11–14 | 5% ether-ethanol | 200 |
| 15–18 | 1:1 ether-ethanol | 162 |
| 18 | Ethanol | 30 |
| | | 814 |

*Hydrochloride of 3,5-cyclo-6-amino-pregnan-20-one.*—The combined fractions 4–7 (320 mg.) are dissolved in methanol and concentrated hydrochloric acid is added to give a pH of 2 and the mixture is placed in a refrigerator for 1 night. The crystallized hydrochloride is centrifuged and weighs 300 mg. It is recrystallized in CH₃OH; melting point 261° C., $[\alpha]_D = +61.5°$.

*Holaphyllamine hydrochloride.*—Fractions 8–18 are combined (444 mg.), dissolved in methanol and converted into the hydrochloride form. The crystallized hydrochloride is absolutely identical to the natural holaphyllamine hydrochloride; melting point, 330° C.; $[\alpha]_D = +33°$ (MeOH) (c.=1).

Reaction in dimethylsulphoxide

*3α-azido-20-ketoximo-pregn-5-ene.*—3.9 g. of 3β-tosyloxy-20-ketoximo-pregn-5-ene are added all at once to a suspension of 12 g. of sodium azide in 90 cc. of anhydrous rectified dimethylsulphoxide (boiling point 189° C.). The mixture is heated from 85 to 95° C. in a nitrogen atmosphere for 7 hours. After dilution with water, the mixture is extracted with a 1:1 ether-benzene mixture. The organic phase is washed in water, dried free of water and distilled to dryness. The residue weighs 3.050 g. By dissolving in methanol, a first stream of crystals is produced weighing 920 mg. with a melting point of 167° C.; they are recrystallized three times in methanol for analysis: 189 $[\alpha]_D$ 0. A second stream weighing 1.95 g. can be yielded by concentration of the mother liquors.

*3α-amino-20-ketoximo-pregn-5-ene.*—900 mg. of the previous azide are treated with a suspension of 1.2 g. of aluminium-lithium hydride in 120 cc. of anhydrous ether. The mixture is agitated at laboratory temperature for 1 night. Excess hydride is removed by an addition of ordinary ether, then water. The precipitate is redissolved by an addition of concentrated hydrochloric acid and the alumina is complexed by an addition of 25 g. of potassium sodium tartrate. The mixture is rendered alkaline by ammonia, then extracted with ether to give a residue weighing 755 mg. after conventional treatment. 3α-amino-20-ketoximo-pregn-5-ene, with a melting point of 239° C., is isolated by crystallization in methanol.

Checks

*Holamine oxime.*—A solution of hydroxylamine acetate in methanol is prepared from 350 mg. of hydroxylamine hydrochloride, 1.2 g. of anhydrous sodium acetate and 25 cc. of methanol. The mixture is boiled with reflux for a few minutes and the sodium chloride is separated by filtration. 390 mg. of holamine dissolved in 10 cc. of methanol are added to the filtered solution and the resulting mixture is boiled for 2 hours. After cooling the mixture is diluted in water, dilute ammonia is added, and the mixture is extracted with methylene chloride.

After conventional treatment the methylene chloride when evaporated to dryness leaves a residue weighing 485 mg. which has been crystallized in methanol; melting point 239° C.

*Analysis.*—Calculated for $C_{21}H_{34}ON_2$: C, 76.31%; H, 10.37%; N, 8.48%. Found: C, 76.07%; H, 10.27%; N, 8.70%.

The IR spectrum of holamine oxime is identical to the spectrum of the oxime prepared by reduction of the azide.

*Hydrolysis of holamine oxime.*—900 g. of holamine oxime are dissolved in 80 cc. of ethanol. 20 cc. of 10% sulphuric acid are added and the mixture is boiled with reflux for 5 hours, with agitation and in a nitrogen atmosphere. The mixture, when cooled to an ambient temperature, is then poured into 400 cc. of water and made alkaline. The solution is then extracted with a 1:2 methylene chloride-ether mixture. The organic portion is washed with water until its pH is 7, then dried free of water by the addition of anhydrous sodium sulphate and evaporated to dryness. The residue is dissolved in 80 cc. of anhydrous ether, whereafter gaseous hydrochloric acid is bubbled into the solution, which is kept in an ice bath, until the solution becomes acid. After storing for a few hours in a refrigerator, the product is filtered and dried at a temperature of 80° C. and at a pressure of 0.01 mm. for 2 hours. 600 mg. of holamine hydrochloride are yielded with a melting point (decomposition) of 258–59° C. Its IR spectrum is identical to the IR spectrum of the holamine-hydrochloride prepared by extraction.

Other applications

PRODUCTION OF HOLAMINOL

*3α-azido-pregn-5-ene-20-one.*—3.4 g. of pregnenolone tosylate are added all at once to a suspension of 12 g. of sodium azide in 90 cc. of dry rectified dimethyl sulphoxide. The mixture is heated at 90° C. with agitation for 5½ hours. The mixture when cooled is diluted with water and extracted with a 2:1 ether-benzene mixture. The solvent when washed, dried free from water and distilled leaves a residue of 2.22 g. which crystallizes in methanol; melting point 155° C., $[\alpha]_D$ +61 (CHCl₃), c.=1.

Analysis ($C_{22}H_{31}ON_3$): Reduction—480 mg. of azide; 40 cc. of anhydrous ether, 500 mg. of AlLiH₄. Agitation for one night.

After extraction 380 mg. of product are yielded which crystallize in ethyl acetate. Melting point: 205° C., $[\alpha]_D$ 78.6, CHCl₃, c.=105.

A product for which the IR spectrum and the melting point are similar and which is mixed with holaminol is prepared by reduction of natural holamine.

*Analysis.*—Calculated for $C_{21}H_{35}ON$: C, 79.44%; H, 11.11%; N, 4.41%. Found: C, 79.49%; H, 11.07%; N, 4.71%.

*Raschig reaction on 3-5-cyclo-6-amino-20-oxo-pregnane*

420 mg. from the 1:1 benzene-ether fractions of the chromatography are dissolved in 30 cc. of methylene chloride. 220 mg. of N-chlorosuccinimide are added with agitation to the starting solution. Agitation continues for 1 hour. The solution is then washed three times in water, dried free of water by the addition of anhydrous sodium sulphate, and distilled to dryness. The residue of 525 mg. is then treated with a sodium methanolate solution prepared by adding 490 mg. of sodium to 30 cc. of absolute methanol. The solution is boiled with reflux for 40 minutes, whereafter the cooled solution is introduced into 400 cc. of sulphuric water containing 2% sulphuric acid. This mixture is left to stand for 1 night. Extraction is then performed with methylene chloride. The methylene chloride is washed, dried free of water and distilled. The residue of 320 mg. is sublimated.

The sublimated product, weighing 250 mg., crystallizes in ethanol. Melting point: 162° C. The IR spectrum is identical to the IR spectrum of 3-5-cyclo-6-20-dioxo-pregnane, with a melting point of 164.5° C.

*Preparation of 3,5-cyclo-6,20-dioxo-pregnane*

3.600 g. of pregnenolone tosylate and 4 g. of potassium acetate are reflux treated with 130 cc. of acetone and 32.5 cc. of water for 20 hours. The acetone is then removed and extraction made with ether in the presence of bicarbonated water. The ether when washed in water, dried free of water and distilled leaves a residue of 2.20 g. which crystallizes in methanol and gives a product having a melting point of from 175 to 177° C. and which is 3,5-cyclo-pregnane - 6 - ol - 20 - one. $[\alpha]_D$=+116°5 (CHCl₃, c.=1.2).

Analysis (calculated by $C_{21}H_{32}O_2$): 1.200 g. of this alcohol is dissolved in 12 cc. of anhydrous pyridine. This solution is added drop by drop to a suspension of 1.200 g. of CrO₃ in 12 cc. of anhydrous pyridine. It is left in contact for 1 night. The mixture is then diluted with 200 cc. of ether and filtered on infusorial earth. The ether when washed three times in water, dried and distilled leaves a residue of 1.1 g. which crystallizes in ethanol and gives a product having a melting point of 165° C., $[\alpha]_D$ +121°3.

VII.—SYNTHESIS OF HOLAPHYLLINE THROUGH THE AGENCY OF ENAMINE

(1) *Enamine of progesterone*

5 gr. of progesterone are heated in an autoclave, the volume of which is 125 ml. with 30 ml. of anhydrous dimethylamine in the presence of 100 mgr. of paratoluene sulphonic acid and 10 gr. of anhydrous calcium sulphate.

The heating is continued at a temperature of 100° C. for one night. The dimethylamine is evaporated and the product obtained is again dissolved in methylene chloride.

The methylene chloride is washed with water, dried free of water by the addition of anhydrous sodium sulphate and distilled.

The residuum is dissolved again in acetone in which 2.620 gr. of enamine crystallize, said enamine having a melting point at 165° C. $[\alpha]_D$=−32.5° (CHCl₃, c.=1.26).

*Analysis.*—Calculated for $C_{23}H_{35}ON$=341.52: C, 80.88%; H, 10.33%; N, 4.10%. Found: C, 81.09%; H, 10.32%; N, 4.36%.

(2) *Reduction of the enamine*

*3β-dimethylamino-20β-hydroxy-pregn-5-ene.*—1 gr. of the above enamine is dissolved in 40 ml. of methanol. 2 gr. of borohydride of potassium are added by small fractions and the mixture is stirred for 5 hours.

The product obtained is diluted with water and extracted with chloroform. The chloroform is washed four times with water, dried free of water by the addition of anhydrous sodium sulphate and distilled.

The residuum weighing 1 gr. is crystallized again in methanol and has a melting point equal to 196° C., while its specific optical rotation is −64° in CHCl₃ at a concentration of 1.1.

*Analysis.*—Calculated for $C_{23}H_{39}NO$: C, 79.94%; H, 11.37%; N, 4.05%. Found: C, 79.7%; H, 11.1%; N, 4.1%.

(3) *3β-dimethylamino-20β-acetoxy-pregn-5-ene.*—1 gr. of the preceding product is dissolved by heating slightly in 10 ml. of pyridine dried over potash and 10 ml. of acetic anhydride.

The products are left in contact with one another for one night. They are then evaporated to dryness in vacuo and dissolved again in water, after which they are extracted with chloroform, after alkalinization with sodium carbonate. The chloroform is washed, dried free of water and distilled.

The residuum, weighing 1.175 gr. is passed on 12 gr. of alumina.

The fraction eluted with benzene, weighing 0.830 gr. is crystallized again in methanol.

(4) Demethylation through Von Braun's method

3β-METHYLAMINO-20-β-HYDROXY-PREGN-5-ENE (a) *Preparation of the cyanamide.*—750 gr. of 3β-dimethylamino-20β-acetoxy-pregn-5-ene are dissolved in 30 ml. of anhydrous ether and added drop by drop with stirring into a solution of 2 gr. of cyanogen bromide in 40 ml. of anhydrous ether.

The stirring is continued for 2 hours.

As the reaction proceeds the ether-insoluble product precipitates in the ether and is separated. The product obtained weighs 95 mgr. The ether is distilled until dryness is obtained; the residuum weighing 700 mgr. of which the spectrum shows a cyanamide band is then saponified.

(b) *Saponification of the cyanamide.*—The 700 mgr. of cyanamide are heated for 48 hours with 20 ml. of methanol, 2 ml. of water and 2 gr. of KOH.

The product is then diluted in water and extracted with chloroform.

The chloroform when washed, dried free of water, and distilled, leaves a residuum weighing 550 mgr.

Said residuum is dissolved in methanol which forms 150 mgr. of crystalline product. Said product shows an infra-red spectrum which is identical with that of holaphyllinol and through further crystallization, a product is obtained, having as a melting point 226° C., while $[\alpha]_D = -75°$ (CHCl$_3$, c.=1.02).

*Analysis.*—Calculated for $C_{22}H_{37}ON$: C, 79.70%; H, 11.25%; N, 4.23%. Found: C, 79.56%; H, 11.18%; N, 4.50%.

(5) 3β-methylamino-20-oxo-pregna-5-ene

Oxidation by Djerassi's method: 150 mgr. of the above-crystallized product are dissolved in 20 ml. of acetone.

Into the solution cooled by ice, there is added 0.2 ml. of an oxidizing reagent.

(Oxidizing reagent: 23 ml. of concentrated $SO_4H_2$ together with the required amount of distilled water to form 100 ml. and into this solution is dissolved 26.73 gr. of $CrO_3$.)

After incorporation of the reagent, the solution is stirred for 10 minutes in a nitrogen atmosphere.

It is then poured into 50 ml. of a solution of 10% sodium acetate and extracted with ether. After alkalinization with $CO_3Na_2$ the washed, dried and distilled ether leaves a residuum weighing 130 mgr.

It is sublimized and crystallized in NaOH and forms a product having a melting point at 128° C. and an $[\alpha]_D = +23°$.

*Analysis.*—Calculated for $C_{22}H_{35}ON$ (329.51): C, 80.19%; H, 10.71%; N, 4.25%. Found: C, 79.95%; H, 10.65%; N, 4.35%.

The infra-red spectrum is identical with that of holaphylline.

What I claim is:

1. A method for the preparation of a 3 amino steroid compound in the pregnen 5 series, said method comprising reacting tosylate of pregnenolone with a member selected from the group consisting of ammonia, methylamine and dimethylamine to form an amine precipitate, extracting the precipitate with ether and eluting the extracted product to produce the 3 amino steroid compound.

2. A method for the synthesis of holaphylline which comprises reacting methylamine with pregnenolone tosylate, dissolving the reaction product in ether and treating with hydrochloric acid to produce a hydrochlorate precipitate, subjecting the precipitate to ether extraction and eluting the extracted precipitate to produce holaphylline.

3. A method as claimed in claim 2, comprising preparing said pregnenolone tosylate by the dissolution of pregnenolone and the addition of paratoluene sulphochloride previously recrystallized in chloroform, the resultant product being allowed to settle and being thereafter mixed with ether and washed, dried and distilled, said reacting of methylamine and the tosylate comprising heating the latter in a benzene solution of methylamine for about 22 hours, evaporating until dryness is obtained, dissolving the dried product in ether and soda, washing the obtained ether solution with water and mixing the latter with the said precipitate which is ether-insoluble and then washing the ether solution with alkaline water until neutrality is obtained, the ether solution then being washed with water, dried and distilled and the residuum dissolved in benzene and restored to the original pregnenolone, and extracting the hydrochloride precipitate from the washing water with ether after alkalinization, the ether being then washed, dried and distilled and the residuum subjected to elution to obtain holaphylline.

4. A method as claimed in claim 3 according to which the last said elution is performed with benzene, ether and methanol, the product which is eluted with methanol being the holaphylline.

5. A method as claimed in claim 4 according to which the product obtained by elution with benzene is treated to obtain a hydrochloride, from which a base is formed which is treated with formic acid and formaldehyde, after which the cooled and alkalinized solution is extracted with ether.

6. A method as claimed in claim 4, wherein the ether solution is washed with ether before alkalinization and said washing ether is washed with water, dried with sodium sulphate and distilled to leave a residuum which is subjected to chromatography on alumina, to provide pregnenolone upon elution with ether.

7. A method for the synthesis of 3β-dimethylamino-oxo-20-pregnen-5-ene comprising mixing holaphylline, formic acid and a solution of formaldehyde, the obtained mixture being then heated, cooled, diluted and extracted with methylene chloride after alkalinization with ammonia, the methylene chloride being washed with water, dried and distilled and the residuum being subjected to chromatography on alumina, while a first fraction eluted with benzene is caused to crystallize in acetone and to provide through further crystallization methylholaphylline.

8. A method for the synthesis of methylholaphylline comprising reacting pregnenolone tosylate with dimethylamine, thereafter adding to the reactant product hydrochloric acid to precipitate hydrochloride and form two fractions, the precipitated hydrochloride being dissolved in methanol, the resulting solution being diluted and extracted with ether after alkalinization, the ether being washed, dried and distilled, the residuum being caused to pass over alumina and eluted with ether and crystallized in methanol to yield methylholaphylline.

9. A method comprising reacting lithium azide in a methanolic solution with 3β-tosyloxy-Δ$^5$-pregnene-20-oximo, reducing the resulting 3-azido derivative with AlLiH$_4$, the oxime group being hydrolyzed so as to obtain a residuum which, upon addition of hydrochloric acid and upon chromatographic treatment, yields a hydrochloride of holaphyllamine and a hydrochloride of 3,5-cyclo-6-amino-pregnan-20-one.

10. A method as claimed in claim 9 according to which hydrolysis of the oxime yields a residuum which is dissolved in benzene and subjected to chromatography to produce an azido 3β-derivative and 3,5-cyclo-6-amino-pregnan-20-one.

11. A method which comprises reacting 3β-tosyloxy-20-hetoximo-pregn-5-ene with sodium azide in dimethylsulphoxide to obtain 3α-azido-20-hetoximo-pregn-5-ene, reacting the latter with aluminium and lithium hydride, to obtain a precipitate which, after being alkalinized, yields a residuum from which is separated 3α-amino-20-ketoximo-pregn-5-ene.

12. A method comprising reacting tosylate of pregnenolone at a temperature of about 90° C. with sodium azide in dimethylsulphoxide, cooling the resulting reaction product and subjecting the same to extraction with an ether-benzene mixture and to reduction with aluminium lithium hydride to produce holaminol.

13. A method for preparing 3,5-cyclo-6,20-dioxo-pregnene which comprises forming a mixture of tosylate of pregnenolone and potassium acetate, treating the mixture with acetone, extracting with ether, washing, drying and distillating to leave a residuum which crystallizes in methanol and produces 3,5-cyclo-pregnan-6-ol-20-one and reacting the latter with $CrO_3$ in pyridine, to obtain 3,5-cyclo-6,20-dioxo-pregnene.

14. A method for synthesizing holaphylline comprising reacting the dimethylamino enamine of progesterone with potassium borohydride, reacting the resultant product with acetic anhydride to obtain 3β-dimethylamino-20β-acetoxy-pregn-5-ene, and demethylating the latter by reacting the same with cyanogen bromide to produce the corresponding cyanamide, saponifying the cyanamide to obtain 3β-methylamino-20-hydroxy-pregna-5-ene and oxidizing the latter substance to obtain holaphylline.

References Cited by the Examiner

Goutarel et al.: "Bulletin de la Societe Chemique de France", March 1962 (pages 646–7 relied on).

LEWIS GOTTS, *Primary Examiner.*